(12) United States Patent
Bernal et al.

(10) Patent No.: US 9,424,747 B2
(45) Date of Patent: Aug. 23, 2016

(54) VEHICLE COUNTING METHODS AND SYSTEMS UTILIZING COMPRESSED VIDEO STREAMS

(75) Inventors: Edgar A. Bernal, Webster, NY (US); Robert P. Loce, Webster, NY (US); Orhan Bulan, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1000 days.

(21) Appl. No.: 13/453,245

(22) Filed: Apr. 23, 2012

(65) Prior Publication Data
US 2013/0278767 A1 Oct. 24, 2013

(51) Int. Cl.
| G08G 1/01 | (2006.01) |
|---|---|
| G06K 9/00 | (2006.01) |
| H04N 19/513 | (2014.01) |
| H04N 19/61 | (2014.01) |

(52) U.S. Cl.
CPC .......... *G08G 1/0133* (2013.01); *G06K 9/00785* (2013.01); *H04N 19/513* (2014.11); *H04N 19/61* (2014.11)

(58) Field of Classification Search
CPC .... H04N 19/61; H04N 19/513; G08G 1/0133
USPC ................................................. 348/143, 148
See application file for complete search history.

(56) References Cited

U.S. PATENT DOCUMENTS

| 2005/0190975 | A1* | 9/2005 | Porikli | G06K 9/00711 |
| | | | | 382/235 |
| 2011/0176000 | A1* | 7/2011 | Budge | G06K 9/00771 |
| | | | | 348/143 |
| 2012/0148094 | A1* | 6/2012 | Huang | G06K 9/00785 |
| | | | | 382/103 |
| 2013/0101171 | A1* | 4/2013 | Bulan et al. | 382/104 |
| 2013/0155228 | A1* | 6/2013 | Farn | H04N 19/543 |
| | | | | 348/143 |

OTHER PUBLICATIONS

U.S. Appl. No. 13/277,719, filed Oct. 20, 2011, Bulan et al.
C. Beal and T. Myers, "High-Definition Video over IP," Cohu Inc. white paper, 2010, 4 pages.
Gary J. Sullivan and Thomas Wiegand, "Rate-Distortion Optimization for Video Compression," IEEE Signam Processing Magazine, Nov. 1998, pp. 74-90.
B. K. P. Horn and B. G. Schunck, "Determining Optical Flow," Artificial Intelligence 17 (1981), pp. 185-203.
Y. W. Huang et al., "Survey on Block Matching Motion Estimation Algorithms and Architectures with New Results," Journal of VLSI Signal Processing Systems 42, published Feb. 13, 2006, pp. 297-320.
Interview with Dave Evans, "Interesting Snippet", Chief Futurist for Cisco Systems, web page address:http://interestingsnippets.tumblr. com/post/905661206/humans[generated-more-data-in-2009_ than_in, Aug. 5, 2010, 2 pages.

* cited by examiner

*Primary Examiner* — Tung Vo
*Assistant Examiner* — Rowina Cattungal
(74) *Attorney, Agent, or Firm* — Fay Sharpe LLP

(57) ABSTRACT

This disclosure provides method and systems of recording a predetermined event associated with a moving object, the predetermined event captured with an image capturing unit and one or more of the associated frames compressed, producing one or more motion vectors. According to one exemplary embodiment, vehicle counting is performed based on motion vectors produced during the data compression process, either inline or offline.

16 Claims, 8 Drawing Sheets

VEHICLE COUNTING METHODS AND SYSTEMS UTILIZING COMPRESSED VIDEO STREAMS

CROSS REFERENCE TO RELATED PATENTS AND APPLICATIONS

U.S. patent application Ser. No. 13/277,719, filed Oct. 20, 2011 by Bulan et al. and entitled "SYSTEM FOR AND METHOD OF SELECTIVE VIDEO FRAME COMPRESSION AND DECOMPRESSION FOR EFFICIENT EVENT-DRIVEN SEARCHING IN LARGE DATABASES" is incorporated herein by reference in its entirety.

BACKGROUND

Automated vehicle counting is an important tool that is widely used by traffic planners. It helps local governments determine critical traffic flow time periods, maintenance schedules and optimal traffic enforcement time periods. It also aids incident detection, verification and response. Recently, retailers have also expressed interest in automated vehicle counting solutions which will help them determine the factors that influence traffic through stores; for example, a restaurant chain or retail store with a video-based vehicle-counting solution. Traditionally, vehicle counting has been performed by using on-road devices, i.e. roadway sensors, such as pressure hoses and induction coils, but these are typically inaccurate and may be expensive to deploy and maintain. Video-based vehicle counting utilizes existing and ever-expanding camera networks aimed at traffic law enforcement and surveillance applications, but it is typically performed offline and is computationally expensive. What is needed is a method to perform vehicle counting on the compressed video stream associated with many existing video/image capturing systems and/or to seamlessly integrate vehicle counting into the compression process itself.

INCORPORATION BY REFERENCE

"High-Definition Video over IP," C. Beal and T. Myers, Cohu Inc. white paper, 2010, 4 pages;
"Rate-Distortion Optimization for Video Compression," Gary J. Sullivan and Thomas Wiegand, IEEE Signam Processing Magazine, November 1998, pages 74-90;
"Determining Optical Flow," B. K. P. Horn and B. G. Schunck, Artificial Intelligence 17 (1981), pages 185-203;
"Survey on Block Matching Motion Estimation Algorithms and Architectures with New Results," Y. W. Huang et al. Journal of VLSI Signal Processing Systems 42, published Feb. 13, 2006, pages 297-320; and
"Interesting Snippet", Interview with Dave Evans, Chief Futurist for Cisco Systems, Aug. 5, 2010, 2 pages, web page address, http://interestingsnippets.tumblr.com/post/905661206/humans[generated-more-data-in-2009_than_in, are all incorporated here by reference in their entirety.

BRIEF DESCRIPTION

In one embodiment of this disclosure, described is a computer-implemented method of recording the occurrence of a predetermined event associated with a moving object, the predetermined event captured using an image capturing device directed towards a target region associated with the predetermined event, the method comprising a) the image capturing device acquiring a series of temporal related image frames including the target region, each image frame including pixel data representative of the image frame; b) compressing the pixel data associated with one or more of the image frames using a compression process configured to generate one or more motion vectors representative of the moving object; c) determining if the predetermined event occurred based on the one or more motion vectors representative of the moving object; and d) recording the occurrence of the predetermined event if step c) determines the predetermined event occurred.

In another embodiment of this disclosure, described is an image capturing system for recording an occurrence of a predetermined event associated with a moving object, the image capturing system comprising an image capturing device directed towards a target region associated with the predetermined event, an image processor operatively associated with the image capturing device, the image processor configured to perform a method of recording the occurrence of the predetermined event associated with the moving object comprising a) the image capturing device acquiring a series of temporal related image frames including the target region, each image frame including pixel data representative of the image frame; b) compressing the pixel data associated with one or more of the image frames using a compression process configured to generate one or more motion vectors representative of the moving object; c) determining if the predetermined event occurred based on the one or more motion vectors representative of the moving object; and d) recording the occurrence of the predetermined event if step c) determines the predetermined event occurred.

BRIEF DESCRIPTION OF THE DRAWINGS

FIG. 5 illustrates a reference frame including a reference block and a search window and
FIG. 6 illustrates a target frame including a target block;
FIG. 7 is a reference frame,
FIG. 8 is a target frame,
FIG. 9 is a resulting motion vector field,
and
FIG. 10 is a predicted frame. Notably, the image capturing device is scanning/panning with the vehicle as it moves;
FIG. 11 is a reference frame,
FIG. 12 is a target frame and
FIG. 13 is the resulting motion vector field.

DETAILED DESCRIPTION

Figure 1:
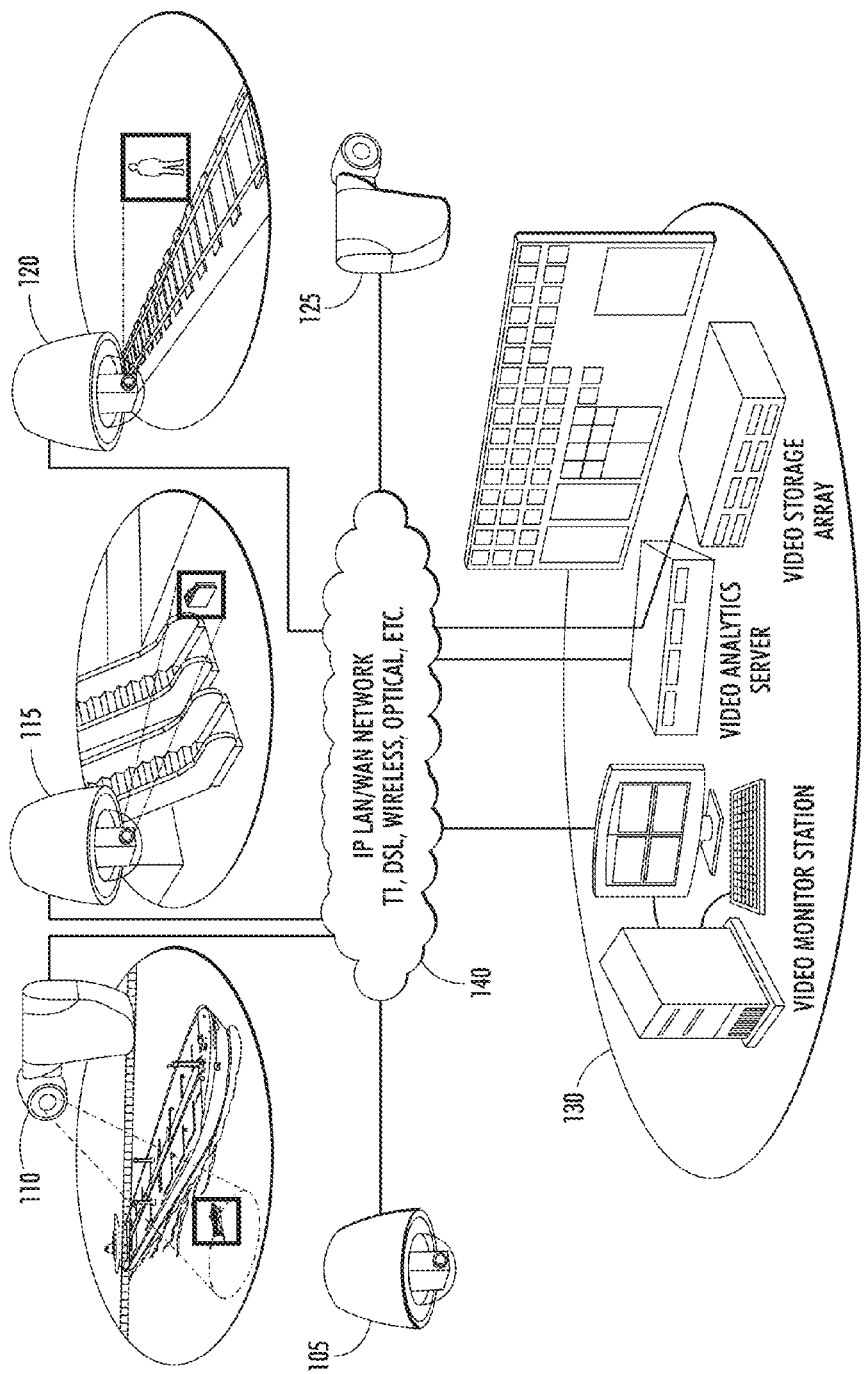
FIG. 1 illustrates a video camera network system.

This disclosure provides methods and systems for recording the occurrence of a predetermined event associated with a moving object, for example, but not limited to, counting the number of vehicles which pass through a target region such as a specific segment of road. The disclosed recording methods and systems operate directly on a compressed video data stream, without the need to perform decompression. Alternatively, it can be implemented as one step within a video compression process. The method comprises the following steps: (1) determining the virtual location of a region(s) across which vehicle counting is to be performed, designated as virtual target areas; (2) extracting motion vectors associated with non-reference frames in and about the virtual target areas from a compressed data stream or from an incoming, live uncompressed video stream; (3) determining if the motion vectors represent vehicle motion; (4) incrementing a vehicle count if the motion vectors indicate that pixels belonging to a vehicle traverse the virtual target regions and their surroundings; and, optionally (5) embed vehicle count results in metadata fields within the compressed data stream. Since the motion vectors from (2) are either readily available from a compressed data stream, or are calculated as one of the compression steps prior to archival or transmission, the motion vector based method of recording events, i.e. counting moving objects, offers significant savings in computational resources.

It is to be understood that the detailed description which follows specifically describes methods and systems for vehicle counting associated with an image capturing system, such as a video camera. However, as will be understood by those in the art, the methods and systems disclosed are generally applicable to recording the occurrence of a predetermined event associated with a moving object. For example, recording the occurrence of a ship passing through a target area; recording/counting pedestrian traffic past a retail shop; recording the occurrence of multiple objects, such as vehicles and pedestrians, pass through an intersection, etc.

As briefly discussed in the Background section, data derived from traffic volume studies can help local governments estimate road usage, volume trends, critical flow time periods, optimal maintenance schedules, as well as optimal traffic enforcement time periods. Real-time traffic flow data can also enable efficient incident management, which consists of incident detection, verification and response. The past decade or so has seen ever-increasing interest by retailers to understand, manage and capitalize on the traffic trends of their customers.

Traditional approaches to automated vehicle counting include roadway sensors such as pressure hoses, piezoelectric sensors and induction coils. These methods are typically inaccurate as well as difficult and sometimes expensive to install and maintain, as they have to be physically laid out under the surface of the target road or highway. Less intrusive roadway sensor systems such as radar- and laser-based systems are sometimes employed, but they are expensive and they are highly sensitive to environmental conditions. However, one disadvantage associated with roadway sensors is that they provide limited information, namely vehicle count or traffic speed and/or volume only.

Video-based vehicle-counting solutions, on the other hand, can be provided as a value-added option to already deployed traffic or surveillance camera network systems devoted to traffic monitoring, speed, red light, stop sign, toll management and other law enforcement activities, as well as safety and security tasks. One disadvantage associated with the video-based vehicle counting, presently, is that it is computationally expensive, since it typically involves the execution of complex motion detection and tracking algorithms on uncompressed video streams.

Video compression is essential in applications where high quality video transmission and/or archival is required. With reference to FIG. 1, illustrated is a video surveillance system which includes a set of dome cameras 105, 110, 115, 120 and 125 that relay video data to a central processing and archival facility 130. While the communication network used to transport the video stream between the cameras and the central facility may be built on top of proprietary technology, traffic management centers have recently started to migrate to Internet Protocol- or IP-compliant networks 140.

Whichever is the case, the underlying communication network typically has bandwidth constraints which dictate the use of video compression techniques on the camera end, prior to transmission. In the case of legacy analog cameras, compression is performed by an external encoder attached to the camera, whereas digital cameras typically integrate an encoder within the camera itself. Typical transmission rates over IP networks require the frame rate of uncompressed multi-megapixel video streams to be limited to fewer than five frames per second (fps). The latest video compression standards enable the utilization of the full 30 fps camera capabilities at the same resolutions and network bandwidth. For example, transmission of 1080p HD uncompressed video requires a bandwidth of 1.5 Gbps, while its compressed counterpart requires only 250 Mbps; consequently, transmission of compressed video with 6 times the frame rate of the uncompressed version would be possible over the same network infrastructure. See "High-Definition Video over IP," C. Beal and T. Myers, Cohu Inc. white paper, 2010, 4 pages.

Figure 2:
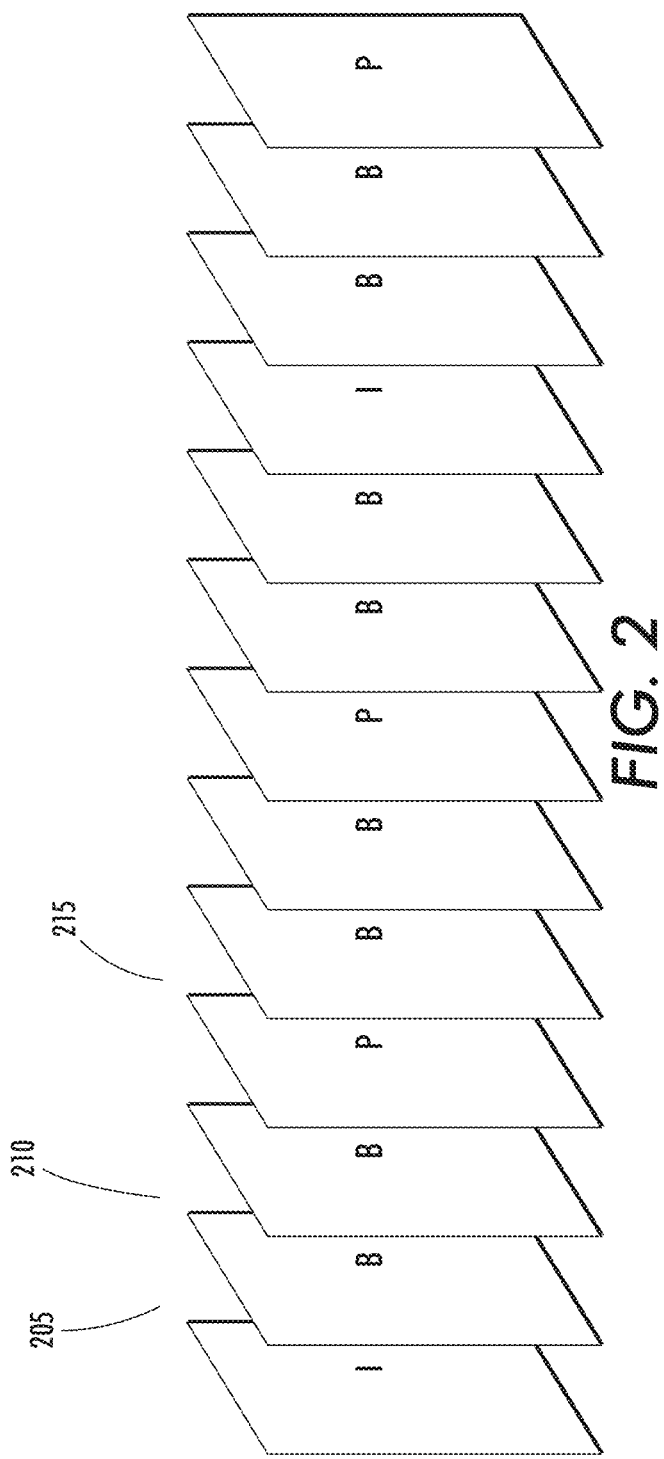
FIG. 2 is a schematic diagram of a video compression technique used according to an exemplary embodiment of this disclosure, the diagram showing reference (I) and non-reference (P and B) frames.

Video compression is achieved by exploiting two types of redundancies within a video stream: spatial redundancies among neighboring pixels within a frame, and temporal redundancies between adjacent frames. This modus operandi gives raise to two different types of prediction, namely intra-frame and inter-frame prediction, which in turn result in two different types of encoded frames, reference 205 and non-reference frames 210, 215, as depicted in FIG. 2. Reference frames 205, or I-frames, are encoded in a standalone manner (intra-frame) using compression methods similar to those used to compress digital images. Compression of non-reference frames (P- and B-frames 215, 210, respectively) entails using inter-frame or motion-compensated prediction methods where the non-reference frame, i.e. target frame, is estimated or predicted from previously encoded frames using a process that typically entails three steps. See "Rate-Distortion Optimization for Video Compression," Gary J. Sullivan and Thomas Wiegand, IEEE Signam Processing Magazine, November 1998, pages 74-90. The three steps include (i) motion estimation, where motion vectors are estimated using previously encoded frames, where the target frame is segmented into pixel blocks called target blocks, and an estimated or predicted frame is built by stitching together the blocks from previously encoded frames that best match the target blocks. Motion vectors describe the relative displacement between the location of the original blocks in the reference frames 205 and their location in a predicted frame (not shown). While motion compensation of P-frames 215 relies only on previous frames, previous and future frames are typically used to predict B-frames 210; (ii) residual calculation, where the error between the predicted and target frame is calculated; and (iii) compression, where the error residual and the extracted motion vectors are compressed and stored.

With reference to FIG. 2, a schematic diagram of a video compression process is provided, as well as further details of the video compression technique. As previously stated, certain video compression processes (e.g., MPEG-1, MPEG-2, MPEG-4, H.261, H.263, H.264/AVC) rely on exploiting spatial and temporal correlation across video frames as disclosed above. Specifically, the techniques treat each video frame as either a reference frame ("Index Frame" or "I-frame") 205 or a non-reference frame. A non-reference frame may be a bi-directionally coded frame ("B-frame") 210, using prior and subsequent frames, or predictive coded frame ("P-frame") 215, using prior frames only.

I-frames 205 are treated as stand-alone images for purposes of compression. Such frames are compressed using image-compression-like techniques (e.g., techniques similar to JPEG, JPEG200) that do not require data from any other frames in the video sequence. Thus, I-frames 205 may be compressed and decompressed in isolation, without requiring information from any other video frame. Compression of I-frames is achieved by, for example, exploiting spatial redundancies between adjacent pixels within the target frame.

Non-reference B-frames 210 and P-frames 215 require information from one or more surrounding video frames for purposes of compression. Compression of non-reference frames is achieved by exploiting temporal redundancies between adjacent frames. This is achieved by using inter-frame or motion-compensated prediction methods, where the target frame is estimated or predicted from previously encoded frames in a process that typically entails three steps. The first step, motion estimation, entails estimation of motion vectors with the help of previously encoded frames. The target frame is segmented into pixel blocks called target blocks, and an estimated or predicted frame is built by combining blocks from previously encoded frames that best match the target blocks. Motion vectors describe the relative displacement between the location of the original blocks in the reference frames and their location in the predicted frame. While P-frames 215 use only previous frames in the motion estimation, B-frames 210 require both previous and future frames for the first step. The second step calculates an error residual between the estimated frame and the target frame. The third step stores the error residual and the extracted motion vectors.

Decompressing a non-reference frame requires first decompressing the previous (and, for B-frames, subsequent) frames used in the motion estimation stage. This creates a sequential dependence among the frames for decompression purposes. The reference I-frames 205, however, can be decompressed individually, without requiring the other frames to be decompressed first.

Video compression processes typically select reference frames at a fixed rate (e.g., one reference frame per every thirty total frames), with an option to insert asynchronous reference frames for capturing significant scene changes. The reference frame rate affects compression efficiency, but does not overtly affect the quality of the resulting video.

For video acquired with a stationary camera—the category under which most traffic cameras currently deployed fall—the primary cause of changes between adjacent frames corresponds to object motion. Correspondingly, the output from the motion compensation stage includes an estimate of the optical block flow describing the way pixel blocks move between adjacent frames. It is only an estimate since the resulting motion vector field is not necessarily smooth, particularly near object boundaries and on smooth image region. As such, the encoded set of motion vectors is a good descriptor of apparent motion of objects within the field of view of an image capturing device, such as a camera.

For a scanning camera configuration, the background of the image will possess motion from frame to frame. The motion vectors associated with the vehicle can be estimated using one or more of several methods. For example, when the vehicle fills the majority of the frame, the mode of the distribution of the motion vector components will represent the vehicle motion. When the vehicle is represented in a minority of the frame, the mode or average motion vector in the periphery of the frame will represent the motion of the camera scan. Subsequently subtracting that motion vector due to camera scan from its respective motion field and thresholding the resulting motion field so that only motion vectors that deviate from the predominant motion vector remain, would result in a motion field that contains motion vectors associated with non-stationary foreground objects. These motion vectors would provide a good description of the apparent motion of objects within the field of view of the moving camera.

Figure 3:
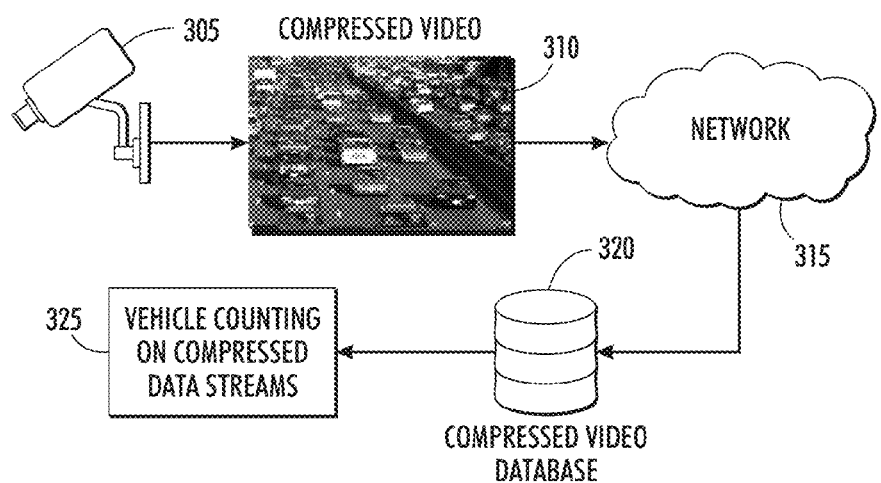
FIG. 3 is a schematic of an image capturing system incorporating an offline vehicle count process utilizing motion vectors according to an exemplary embodiment of this disclosure.
Figure 4:
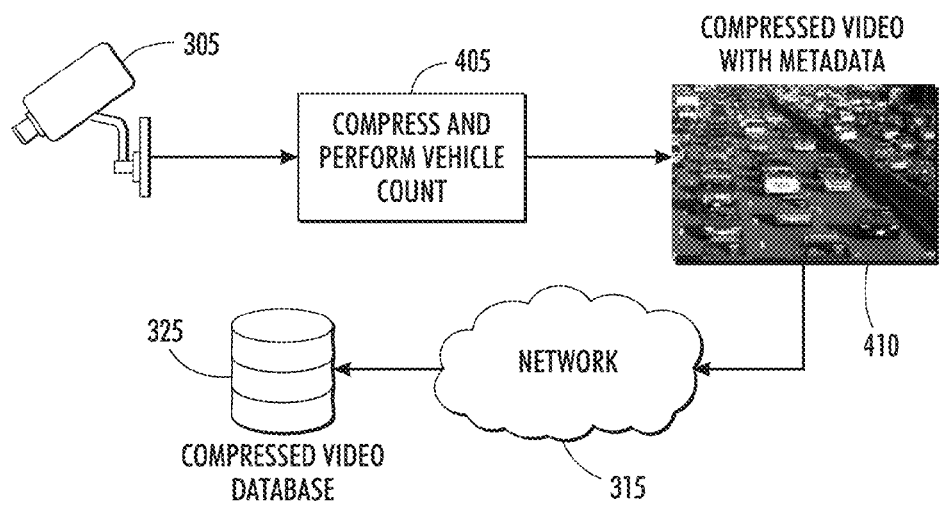
FIG. 4 is a schematic of an image capturing system incorporating an inline vehicle count process utilizing motion vectors according to an exemplary embodiment of this disclosure.

A high-level overview of one exemplary embodiment of the present disclosure is shown in FIG. 3. A compressed video sequence 310 is obtained from a traffic camera 305 that may be deployed for vehicle counting or for any of a number of other purposes, such as speed monitoring, tolling, or surveillance. The compressed video sequence 310 is transmitted over a communication network 315 and stored on a physical medium 320. To obtain statistics about traffic flow of a certain highway or road, the disclosed algorithm processes 325 on the compressed data stream without the need to fully decompress it. Alternatively, as illustrated in FIG. 4, vehicle counting 405 can be performed near or within the camera 305 as an optional step within the compression process. In this case, the vehicle count can be included in the form of metadata within the resulting compressed video stream 410.

The steps involved in the implementation of the offline process shown in FIG. 3 include:

1) Determining the virtual location of the region(s) across which vehicle counting is to be performed, which are defined as virtual target regions.
2) Extracting motion vectors associated with non-reference frames in and about the virtual target areas from the stored compressed data stream.
3) Determining if the motion vectors represent vehicle motion.
4) Incrementing a vehicle count if the motion vectors indicate that pixels belonging to a vehicle traverse the virtual target regions and their surroundings.
5) Optionally, vehicle count results are embedded in the compressed data stream in the form of metadata.

The main difference between the offline process shown in FIG. 3 and the inline process shown in FIG. 4 is the fact that the offline process extracts the motion vectors from the compressed data stream as described in step 2) above, and the inline approach estimates those vectors as part of the motion estimation stage within the video compression process.

Notably, implementation of the offline process does not impose any specific requirements on equipment or systems, and it is relatively easy to implement on computers with access to the stored compressed data. In contrast, implementation of the inline process requires slight modifications to the video compression algorithms at their point of implementation, for example, at the analog to digital converter in the case of analog cameras or the camera itself in the case of digital or IP cameras.

Provided below is a further description of the steps included for the implementation of an offline or inline process to count vehicles based on motion vectors provided by a video data compression process.

Step 1) Determining the location of the virtual target regions.

The location of the virtual target regions are typically input manually as it depends on the geometric configuration of the specific camera and roadway setup. Typical virtual target regions include, but are not limited to, virtual lines that traverse the full width of the road in a direction perpendicular to the direction of traffic, or virtual polygons, usually one per traffic lane. In the case of virtual lines, the vehicle counter is incremented as a vehicle exits the line; in the case of the virtual polygons, the vehicle counter is incremented when motion is detected on a significant portion of the pixels or blocks that are part of the virtual polygons. Alternatively, the location of virtual target regions could also be learned from the historical characteristics of motion vectors. For example, motion vectors of vehicles traversing a certain road will be predominantly oriented along the direction of the road. Virtual target regions can then be automatically defined perpendicularly to this direction.

Step 2) Extracting the motion vectors.

For the offline process, block motion vectors are available as part of the compressed data stream for non-reference frames, that is, frames that are compressed using inter-frame prediction. As previously discussed, standard implementations of video compression algorithms usually utilize fixed rates for reference frame, i.e. I-frame, inclusion, typically in the order of one I-frame every 30 to 50 frames. Since I-frames do not include associated motion vectors, they aren't utilized for vehicle counting purposes. Exclusion of I-frame processing does not have a noticeable impact on the vehicle counting results achieved because they represent a considerable minority of frames.

For the inline process, motion vectors are extracted as part of the motion estimation stage during the video data compression process. Following now is a brief description on how motion vectors are extracted. See "Rate-Distortion Optimization for Video Compression," Gary J. Sullivan and Thomas Wiegand, IEEE Signam Processing Magazine, November 1998, pages 74-90.

Figure 5:
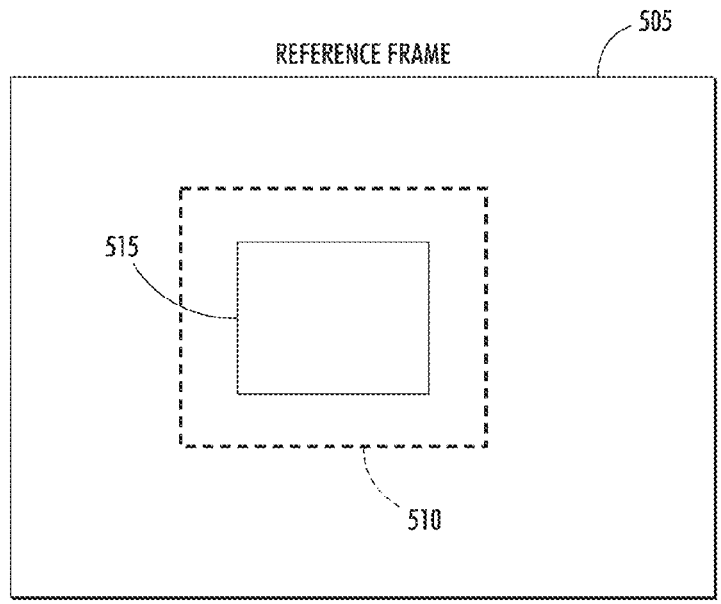
FIGS. 5 and 6 illustrate a block matching algorithm performed according to an exemplary embodiment of this disclosure.
Figure 6:
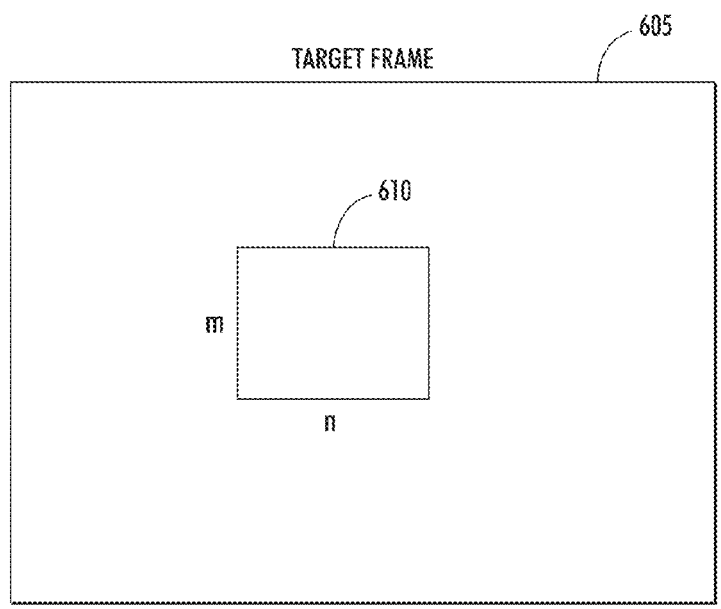

Motion vectors between two adjacent frames in a video sequence can be extracted using a pixel-level optical flow method as described in "Determining Optical Flow," B. K. P. Horn and B. G. Schunck, Artificial Intelligence 17 (1981), pages 185-203. However, this entails the calculation of motion vectors for each pixel in each non-reference frame and is thus highly computationally expensive. Therefore, compression processes such as H264 and MPEG4 typically employ block-based approaches as discussed in "Rate-Distortion Optimization for Video Compression," Gary J. Sullivan and Thomas Wiegand, IEEE Signam Processing Magazine, November 1998, pages 74-90. Importantly, motion vectors in block-based approaches describe motion of matching blocks across adjacent frames and their computation requires significantly less computational resources compared to pixel-level methods. FIGS. 5 and 6 depict a graphical description of a block-based motion estimation process.

The block matching image processing process breaks up the frame to be compressed, referred to as a target frame 605, into pixel blocks of a predetermined size. For example, denote the size of a motion block 610 by m×n pixels, where typically m=n=16 pixels. A search is performed within the reference frame 505 for the block that is most similar to the current m×n target pixel block. Since searching and calculating similarity metrics is a computationally expensive process, a search window 510 is typically defined around the location of the target motion block 515 as shown in FIG. 5. Example dissimilarity criteria between the blocks are the mean squared error (MSE) and the mean absolute difference (MAD), which are calculated as:

$$MSE(d_1, d_2) = \min_{\{d_1, d_2\}} \sum (B(k, l, j) - B(k + d_1, l + d_2, j - 1))^2$$

$$MAD(d_1, d_2) = \min_{\{d_1, d_2\}} \sum |B(k, l, j) - B(k + d_1, l + d_2, j - 1)|$$

where B(k,l,j) denotes the pixel located on the k-th row and l-th column of the m×n block of pixels in the j-th frame. In this case, the j−1-th frame is an already encoded frame being used as a reference frame, and the j-th frame is the target frame. Since both MSE and MAD measure the dissimilarity of two blocks, a block similarity measure can then defined as the reciprocal or the negative MSE or MAD. The motion vector for the target pixel block is the vector $(d_1, d_2)$ that maximizes the block similarity measure between the target and reference blocks. The search for the best matching block in the search window can be conducted using a full exhaustive search, binary search, three step search, spiral search algorithms, etc. See "Survey on Block Matching Motion Estimation Algorithms and Architectures with New Results," Y. W. Huang et al. Journal of VLSI Signal Processing Systems 42, published Feb. 13, 2006, pages 297-320.

Figure 7:
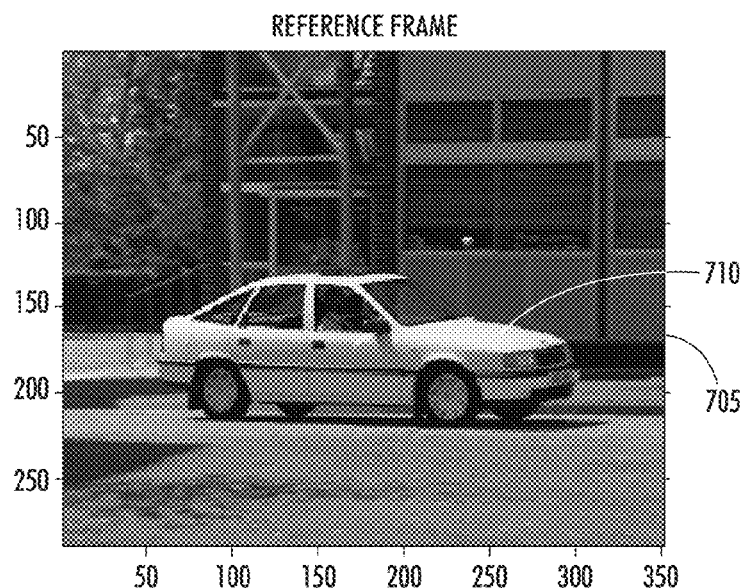
FIGS. 7, 8, 9 and 10 illustrate the results of a block-based motion estimation algorithm performed according to an exemplary embodiment of this disclosure.
Figure 8:
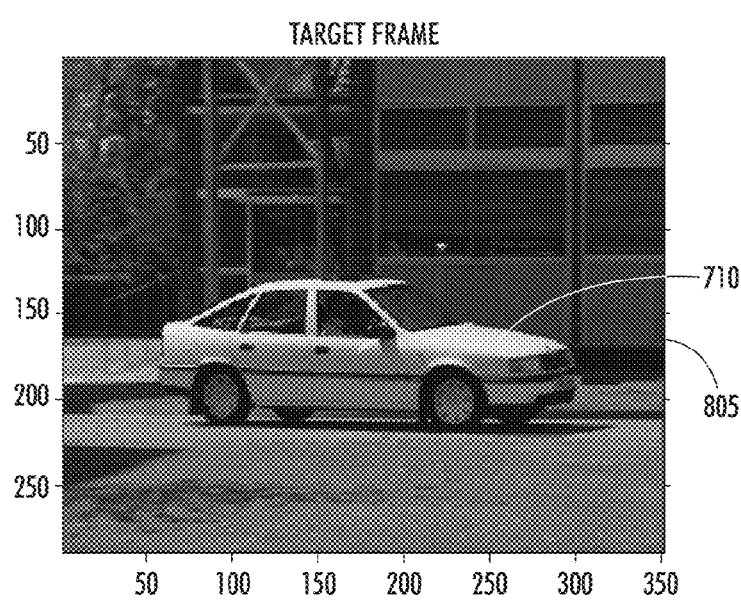
Figure 9:
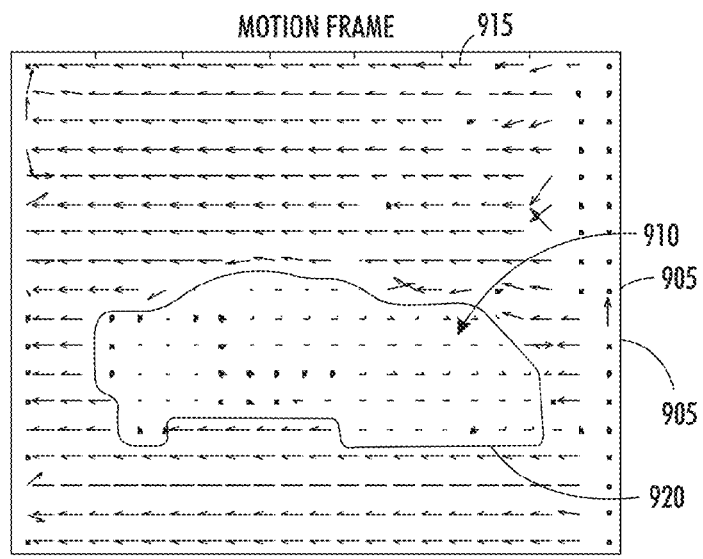
Figure 10:
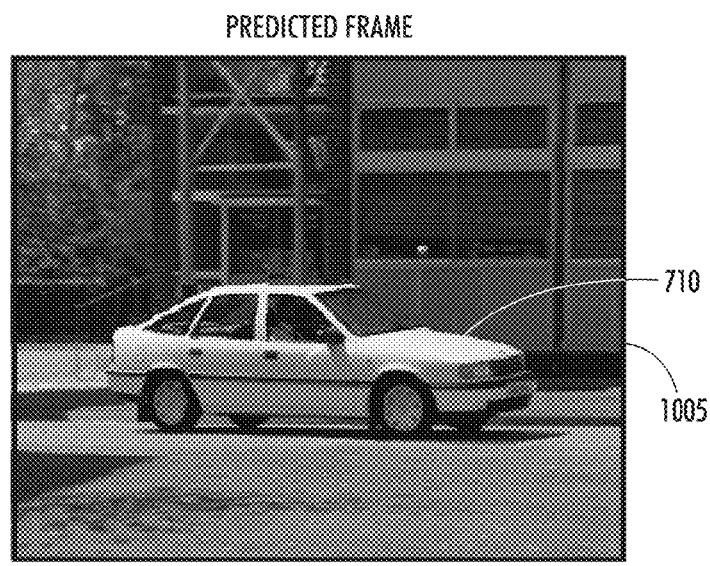

FIG. 9 illustrates the motion vector field 905 resulting from the application of a 16×16 pixel block-based motion estimation process with a 48×48 pixel search to the reference frame 705 depicted in FIG. 7 and the target frame 805 depicted in FIG. 8, each frame including a subject vehicle 710. FIG. 10 shows the predicted image 1005 that results from stitching together the best-matching reference blocks. For this scenario, the camera is physically tracking the vehicle 710 so it scans/pans from left to right as the vehicle moves. As a consequence, all apparent movement that is captured by the vector motion field 915 is that of the background moving from right to left relative to the camera. The apparent movement is represented as motion vectors with an orientation including a leftward component, as indicated by reference character 915. The motion vectors representing the vehicle 910 are generally within an area 920 which outlines the vehicle 710 captured in reference frame 705 and estimated to generate target frame 805.

Step 3) Testing the motion vectors 915 to determine if they represent vehicle motion.

In order to avoid false positives due to fictitious sources of motion such as camera shake, moving leaves and clouds, water waves, etc., only motion vectors with a magnitude larger than a predetermined threshold T are considered. The motion blocks associated with motion vectors larger than T are referred to as active blocks and indicate the existence of a moving object in the blocks.

Figure 11:
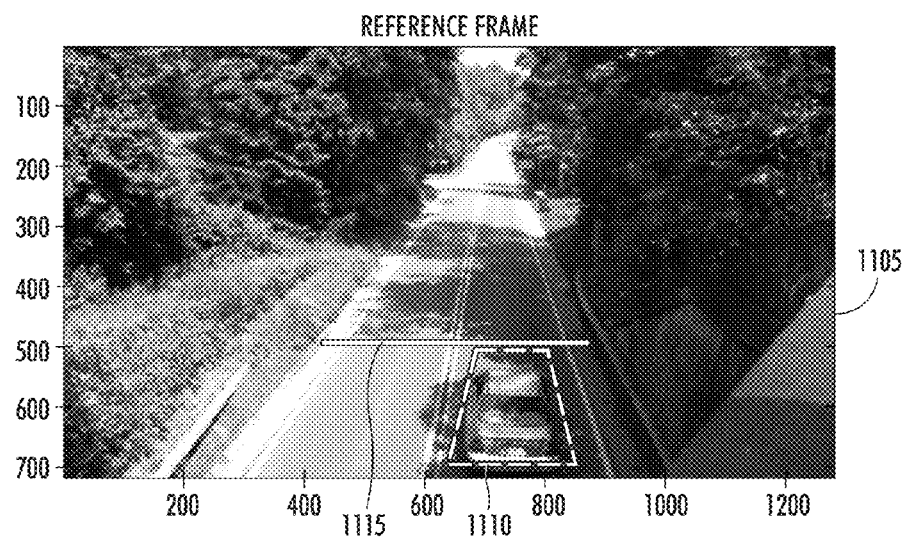
FIGS. 11, 12 and 13 are another illustration of the results of a block-based motion estimation algorithm performed according to another exemplary embodiment of this disclosure.
Figure 12:
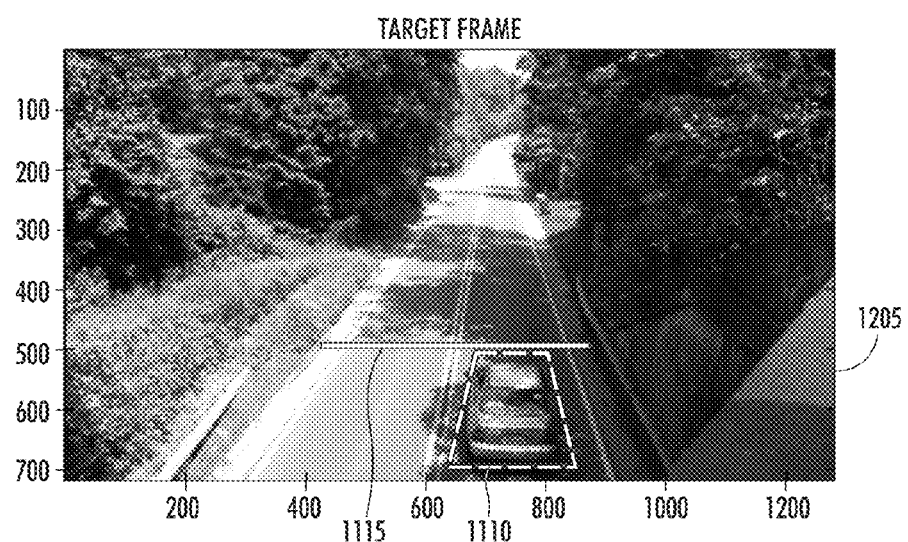
Figure 13:
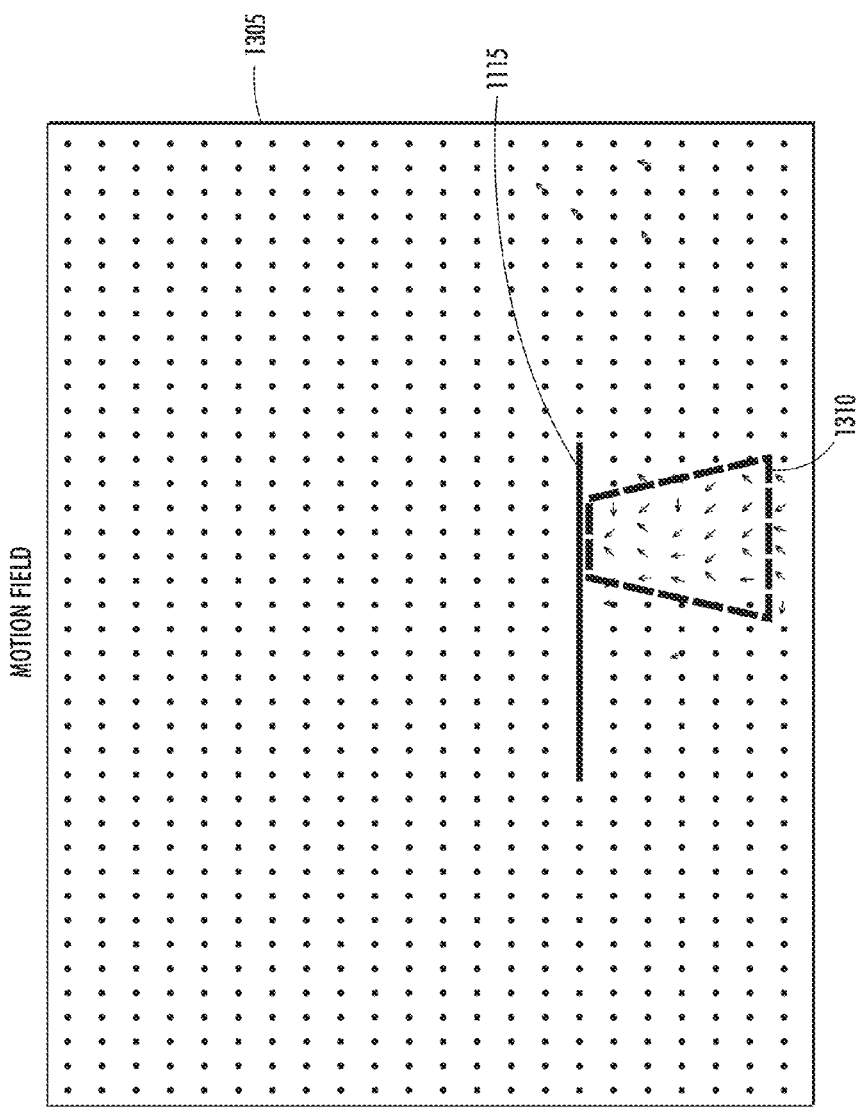

FIGS. 11-13 illustrate how knowledge of motion vectors 1305 for a given target frame 1205 are used in conjunction with the location of the target virtual region in order to trigger a vehicle 1110 counter. Notably, the video is captured utilizing a stationary camera. FIGS. 11 and 12 show two adjacent frames within a video sequence used to illustrate the vehicle counting process disclosed. FIG. 13 shows the corresponding active 32×32 pixel motion vectors using T=8. Superimposed on all three figures are two sample target virtual regions: one virtual line 1115 that traverses the road and one virtual polygon 1310 for the lane on which the car is travelling. Below is described the vector testing (3.x) and incrementing (4.x), separately, for several (x) virtual target areas Step 3.1) Testing the motion vectors using a virtual line.

As a vehicle moves across the virtual line 1115, a number of active motion vectors 1310 will overlap or intersect the virtual line 1115. In order to avoid false positives due to active motion vectors produced by apparent motion of objects different than vehicles, two thresholds are set: a threshold $N_1$ which defines the smallest number of active motion vectors that overlap a virtual line 1115 before a vehicle count can be triggered, and a threshold $N_2$ which defines the smallest number of consecutive frames on which at least $N_1$ active motion vectors overlap a virtual line 1115 before a vehicle count can be triggered.

The value of $N_1$ typically depends on the geometry of the camera setup, the resolution of the video sequence, as well as on the size of the blocks used in the motion estimation process. For example, a reasonable threshold to use would be $N_1=4$ for the video associated with a 720×1280 pixel video sequence and 32×32 pixel motion vectors. The value of $N_2$ will depend on the value of $N_1$, the geometry of the camera setup, the frame rate and the average speed of the road being monitored. For a frame rate of 30 fps and the specifications given above with a target vehicle speed of 35 mph, a reasonable threshold is $N_2=6$.

Step 4.1) Incrementing the vehicle count using a virtual line 1115, subsequent to performing step 3.1.

A vehicle count is triggered on the first frame in which less than $N_1$ active motion vectors intersect the virtual line 1115 after at least $N_2$ consecutive frames of at least $N_1$ active motion vectors intersecting the virtual line 1115.

Step 3.2) Testing the motion vectors using a virtual polygon 1310.

As a vehicle moves across a virtual polygon 1310, a number of active motion vectors will be located inside the polygon. In order to avoid false positives due to active motion vectors produced by apparent motion of objects different than vehicles, two thresholds are set: a threshold $N_3$ which defines the smallest number of active motion vectors inside the virtual polygon before a vehicle count is triggered, and a threshold $N_4$ which defines the smallest number of consecutive frames on which at least $N_3$ active motion vectors are inside the virtual polygon 1310 before a vehicle count is triggered.

The value of $N_3$ typically depends on the geometry of the camera setup, the size of the virtual polygon, the resolution of the video sequence, as well as the size of the blocks used for the motion estimation process. For a video with specifications described above, and the virtual polygon 1310 depicted in FIG. 13, a reasonable threshold to use is $N_3=16$. The value of $N_4$ depends on the value of $N_3$, the geometry of the camera setup, the size of the virtual polygon 1310, the frame rate and the average speed of the road being monitored. For the parameters described above, a reasonable threshold is $N_4=2$.

Step 4.2) Increment the vehicle count using a virtual polygon 1310, subsequent to performing step 4.1.

A vehicle count is triggered on the first frame in which less than $N_3$ active motion vectors are located inside the virtual polygon 1310 after at least $N_4$ consecutive frames of at least $N_3$ active motion vectors are located inside the virtual polygon 1310.

Other Virtual Area Configurations.

In order to improve the process robustness to fictitious motion, which is typically local in nature and may cause over counting, a combination of multiple virtual areas that span a larger portion of the road surface can be used. For example, in a multiple virtual line scenario, a vehicle count is only triggered once a vehicle traverses all the virtual lines. Other possible configurations include multiple virtual polygons or combinations of virtual polygons and lines.

Step 5) Embedding vehicle count results in the form of metadata (Optional).

The ability to include metadata of various types is a key element in MPEG4 and H264. This feature provides additional computational savings as the compression standards make it possible to parse a compressed video stream without actually decoding the video/audio content.

Experimental Results

A single virtual line-based, inline version implemented at the compression stage of the disclosed process was tested on two video sequences shot at a local road, having a total length of over 35 minutes. In order to stray as little as possible from the typical implementations of MPEG4 and H264, the motion estimation block size was set at 16×16 pixels, which is the recommended basic unit size for motion compensated prediction in a number of important coding standards. The block size choice determines, among other performance parameters, the smallest vehicle-to-vehicle distance the process is able to resolve: a block size of m×n pixels in an implementation with a horizontal virtual line renders the algorithm incapable of distinguishing between vehicles that are less than m+1 pixels apart as they cross the virtual line.

A total of 60 vehicles traversing the scene were manually counted.

Notably, a false positive was recorded due to the camera capturing the shadow of a large cloud moving across the field of view. As stated before, the robustness of the process to these types of unwanted motion can be improved by using a combination of multiple virtual areas. Improved robustness to fictitious motion will also improve precision.

It is also worth noting that the process was tested in a scenario of light to medium traffic volume in which the smallest tested distance between adjacent cars was 26 frames or 0.87 seconds. As stated above, the processes capability to resolve two different cars given the distance that separates them is bounded by the size of the block used in the motion compensation stage.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of recording the occurrence of a predetermined event associated with a moving object, the predetermined event captured using an image capturing device directed towards a target region associated with the predetermined event, the method comprising: a) the image capturing device acquiring a series of temporal related image frames including the target region, each image frame including pixel data representative of the image frame; b) compressing the pixel data associated with one or more of the image frames using a compression process configured to generate one or more motion vectors representative of the moving object, step b) including: b1) compressing the pixel data associated with the one or more image frames using a compression process configured to generate one or more motion vectors representative of the moving object; b2) communicating the compressed pixel data of step b1) to a data storage device; and b3) extracting the one or more motion vectors from the compressed pixel data communicated to the storage device; c) determining if the predetermined event occurred based on the one or more motion vectors representative of the moving object; and d) recording and incrementally counting the occurrence of the predetermined event if step c) determines the predetermined event occurred.

2. The computer implemented method according to claim 1, wherein the image capturing device is one of a video camera, infrared camera, thermal camera or satellite imaging camera.

3. The computer implemented method according to claim 1, step b) comprising:
   compressing the pixel data associated with one or more of the image frames using a first compression process to generate reference frames, the first compression process not requiring pixel data associated with other image frames to perform compression of the pixel data associated with the reference frames; and
   compressing the pixel data associated with one or more of the image frames using a second compression process to generate non-reference frames, the second compression process generating the one or more motion vectors representative of the moving object.

4. The computer implemented method of claim 1, wherein the moving object is one of a vehicle, a person, a vessel, a train, an airplane, and an animal, and the predetermined event is associated with movement of the object within the target region.

5. The computer implemented method of claim 1, wherein the moving object is a vehicle and the predetermined event is the movement of the vehicle past a predetermined target region.

6. The computer implemented method of claim 1,
   the compression process of step b) configured to generate one or more motion vector blocks representative of the moving object; and
   step c) determining if the predetermined event occurred based on the one or more motion vector blocks representative of the moving object.

7. The computer implemented method of claim 1, wherein step d) records the occurrence of the predetermined event in the form of metadata embedded in compressed data associated with the video sequence.

8. The computer implemented method of claim 1, wherein the image capturing device is one of stationary and scanning.

9. An image capturing system for recording an occurrence of a predetermined event associated with a moving object, the image capturing system comprising: an image capturing device directed towards a target region associated with the predetermined event, an image processor operatively associated with the image capturing device, the image processor configured to perform a method of recording the occurrence of the predetermined event associated with the moving object comprising: a) the image capturing device acquiring a series of temporal related image frames including the target region, each image frame including pixel data representative of the image frame; b) compressing the pixel data associated with one or more of the image frames using a compression process configured to generate one or more motion vectors representative of the moving object, step b) including: b1) compressing the pixel data associated with the one or more image frames using a compression process configured to generate one or more motion vectors representative of the moving object; b2) communicating the compressed pixel data of step b1) to a data storage device; and b3) extracting the one or more motion vectors from the compressed pixel data communicated to the storage device; c) determining if the predetermined event occurred based on the one or more motion vectors representative of the moving object; and d) recording and incrementally counting the occurrence of the predetermined event if step c) determines the predetermined event occurred.

10. The image capturing system according to claim 9, wherein the image capturing device is one of a video camera, infrared camera, thermal camera or satellite imaging camera.

11. The image capturing system according to claim 9, step b) comprising:
compressing the pixel data associated with one or more of the image frames using a first compression process to generate reference frames, the first compression process not requiring pixel data associated with other image frames to perform compression of the pixel data associated with the reference frames; and
compressing the pixel data associated with one or more of the image frames using a second compression process to generate non-reference frames, the second compression process generating the one or more motion vectors representative of the moving object.

12. The image capturing system according to claim 9, wherein the moving object is one of a vehicle, a person, a vessel, a train, an airplane, and an animal, and the predetermined event is associated with movement of the object within the target region.

13. The image capturing system according to claim 9, wherein the moving object is a vehicle and the predetermined event is the movement of the vehicle past a predetermined threshold associated with the target region.

14. The image capturing system according to claim 9,
the compression process of step b) configured to generate one or more motion vector blocks representative of the moving object; and
step c) determining if the predetermined event occurred based on the one or more motion vector blocks representative of the moving object.

15. The image capturing system according to claim 9, wherein step d) records the occurrence of the predetermined event in the form of metadata embedded in compressed data associated with the video sequence.

16. The image capturing system according to claim 9, wherein the image capturing device is one of stationary and scanning.

* * * * *